US011494932B2

(12) United States Patent
Weinzaepfel et al.

(10) Patent No.: US 11,494,932 B2
(45) Date of Patent: Nov. 8, 2022

(54) DISTILLATION OF PART EXPERTS FOR WHOLE-BODY POSE ESTIMATION

(71) Applicants: NAVER CORPORATION, Gyeonggi-do (KR); NAVER LABS CORPORATION, Seongnam-si (KR)

(72) Inventors: Philippe Weinzaepfel, Montbonnot-Saint-Martin (FR); Romain Bregier, Grenoble (FR); Hadrien Combaluzier, Grenoble (FR); Vincent Leroy, Laval (FR); Gregory Rogez, Gières (FR)

(73) Assignees: NAVER CORPORATION, Gyeonggi-Do (KR); NAVER LABS CORPORATION, Gyeonggi-Do (KR)

( * ) Notice: Subject to any disclaimer, the term of this patent is extended or adjusted under 35 U.S.C. 154(b) by 103 days.

(21) Appl. No.: 16/889,873

(22) Filed: Jun. 2, 2020

(65) Prior Publication Data
US 2021/0374989 A1  Dec. 2, 2021

(51) Int. Cl.
*G06T 7/73* (2017.01)
*G06T 13/40* (2011.01)
*G06K 9/62* (2022.01)
*G06V 40/10* (2022.01)

(52) U.S. Cl.
CPC .............. *G06T 7/73* (2017.01); *G06K 9/627* (2013.01); *G06T 13/40* (2013.01); *G06V 40/103* (2022.01); *G06T 2207/20081* (2013.01); *G06T 2207/30201* (2013.01)

(58) Field of Classification Search
CPC . G06T 7/73; G06T 13/40; G06T 2207/20081; G06T 2207/30201; G06K 9/627; G06K 9/6271; G06V 40/103
See application file for complete search history.

(56) References Cited

U.S. PATENT DOCUMENTS

2008/0104512 A1* 5/2008 Tarlton ...................... G06F 3/01
704/E15.04
2009/0175540 A1* 7/2009 Dariush ................. G06V 40/10
382/195

FOREIGN PATENT DOCUMENTS

JP  2000047267 A  2/2000
JP  2019204476 A  11/2019

OTHER PUBLICATIONS

Xiang et al. , "Monocular total capture: Posing face, body, and hands in the wild." Proceedings of the IEEE/CVF conference on computer vision and pattern recognition. 2019. (Year: 2019).*

(Continued)

*Primary Examiner* — Tapas Mazumder

(57) ABSTRACT

A system for generating whole body poses includes: a body regression module configured to generate a first pose of a body of an animal in an input image by regressing from a stored body anchor pose; a face regression module configured to generate a second pose of a face of the animal in the input image by regressing from a stored face anchor pose; an extremity regression module configured to generate a third pose of an extremity of the animal in the input image by regressing from a stored extremity anchor pose; and a pose module configured to generate a whole body pose of the animal in the input image based on the first pose, the second pose, and the third pose.

21 Claims, 12 Drawing Sheets
(4 of 12 Drawing Sheet(s) Filed in Color)

(56) References Cited

OTHER PUBLICATIONS

Rogez et al., "Lcr-net: Localization-classification-regression for human pose." Proceedings of the IEEE Conference on Computer Vision and Pattern Recognition. 2017, (Year: 2017).*
Andriluka, M., Pishchulin, L., Gehler, P., Schiele, B.: 2D human pose estimation: New benchmark and state of the art analysis. In: CVPR (2014).
Bhardwaj, S., Srinivasan, M., Khapra, M.M.: Efficient video classification using fewer frames. In: CVPR (2019).
Blanz, V., Vetter, T.: A morphable model forthe synthesis of 3D faces. In: SIGGRAPH (1999).
Bogo, F., Kanazawa, A., Lassner, C., Gehler, P., Romero, J., Black, M.J.: Keep it SMPL: Automatic estimation of 3D human pose and shape from a single image. In: ECCV (2016).
Booth, J., Roussos, A., Zafeiriou, S., Ponniahy, A., Dunaway, D.: A 3D morphable model learnt from 10,000 faces. In: CVPR (2016).
Boukhayma, A., de Bem, R., Torr, P.H.S.: 3D hand shape and pose from images in the wild. In: CVPR (2019).
Bulat, A., Tzimiropoulos, G.: How far are we from solving the 2D & 3D face alignment problem? (and a dataset of 230,000 3D facial landmarks). In: ICCV (2017).
Cai, Y., Ge, L., Cai, J., Yuan, J.: Weakly-supervised 3D hand pose estimation from monocular RGB images. In: ECCV (2018).
Cao, C., Weng, Y., Zhou, S., Tong, Y., Zhou, K.: FaceWarehouse: a 3D facial expression database for visual computing. IEEE Transactions on Visualization and Computer Graphics (2013).
Cao, Z., Hidalgo, G., Simon, T., Wei, S.E., Sheikh, Y.: OpenPose: realtime multi-person 2D pose estimation using Part Affinity Fields. In: arXiv preprint arXiv:1812.08008 (2018).
Chen, C.H., Ramanan, D.: 3D human pose estimation = 2D pose estimation + matching. In: CVPR (2017).
Chen, G., Choi, W., Yu, X., Han, T., Chandraker, M.: Learning efficient object detection models with knowledge distillation. In: NeurIPS (2017).
Crasto, N., Weinzaepfel, P., Alahari, K., Schmid, C.: MARS: Motion-augmented RGB stream for action recognition. In: CVPR (2019).
Crispell, D., Bazik, M.: Pix2Face: Direct 3D face model estimation. In: ICCV Workshop (2017).
Deng, J., Roussos, A., Chrysos, G., Ververas, E., Kotsia, I., Shen, J., Zafeiriou, S.: The Menpo benchmark for multi-pose 2D and 3D facial landmark localisation and tracking. IJCV (2019).
Fang, H.S., Xie, S., Tai, Y.W., Lu, C.: RMPE: Regional multi-person pose estimation. In: ICCV (2017).
Feng, Y., Wu, F., Shao, X., Wang, Y., Zhou, X.: Joint 3D face reconstruction and dense alignment with position map regression network. In: ECCV (2020).
Ge, L., Ren, Z., Li, Y., Xue, Z., Wang, Y., Cai, J., Yuan, J.: 3D hand shape and pose estimation from a single RGB image. In: CVPR (2019).
Hampali, S., Rad, M., Oberweger, M., Lepetit, V.: Honnotate: A method for 3D annotation of hand and objects poses, preprint arXiv: 1907.01481 (2019).
Hasson, Y., Varol, G., Tzionas, D., Kalevatykh, I., Black, M.J., Laptev, I., Schmid, C.: Learning joint reconstruction of hands and manipulated objects. In: CVPR (2019).
He, K., Gkioxari, G., Dollar, P., Girshick, R.: Mask R-CNN. In: ICCV (2017).
He, K., Zhang, X., Ren, S., Sun, J.: Deep residual learning for image recognition. In: CVPR (2016).
Hinton, G., Vinyals, O., Dean, J.: Distilling the knowledge in a neural network. In: NIPS workshop (2014).
Hoffman, J., Gupta, S., Darrell, T.: Learning with side information through modality hallucination. In: CVPR (2016).
Hou, S., Pan, X., Change Loy, C., Wang, Z., Lin, D.: Lifelong learning via progressive distillation and retrospection. In: ECCV (2018).
Ionescu, C., Papava, D., Olaru, V., Sminchisescu, C.: Human3.6M: Large scale datasets and predictive methods for 3D human sensing in natural environments. IEEE trans. PAMI (2013).

Jackson, A.S., Bulat, A., Argyriou, V., Tzimiropoulos, G.: Large pose 3D face reconstruction from a single image via direct volumetric CNN regression. In: ICCV (2017).
Johnson, S., Everingham, M.: Clustered pose and nonlinear appearance models for human pose estimation. In: BMVC (2010).
Johnson, S., Everingham, M.: Learning effective human pose estimation from inaccurate annotation. In: CVPR (2011).
Joo, H., Simon, T., Sheikh, Y.: Total capture: A 3D deformation model fortracking faces, hands, and bodies. In: CVPR (2018).
Lassner, C., Romero, J., Kiefel, M., Bogo, F., Black, M.J., Gehler, P.V.: Unite the people: Closing the loop between 3D and 2D human representations. In: CVPR (2017).
Lee, D.H.: Pseudo-label: The simple and efficient semi-supervised learning method for deep neural networks. In: ICML Workshop (2013).
Li, T., Bolkart, T., Black, M.J., Li, H., Romero, J.: Learning a model of facial shape and expression from 4D scans. ACM Transactions on Graphics (ToG) (2017).
Lin, T.Y., Maire, M., Belongie, S., Hays, J., Perona, P., Ramanan, D., Dollar, P., Zitnick, C.L.: Microsoft coco: Common objects in context. In: ECCV (2014).
Liu, X., He, P., Chen, W., Gao, J.: Improving multi-task deep neural networks via knowledge distillation for natural language understanding. arXiv preprint arXiv: 1904.09482 (2019).
Loper, M., Mahmood, N., Romero, J., Pons-Moll, G., Black, M.J.: SMPL: A skinned multi-person linear model. ACM transactions on Graphics (2015).
Lopez-Paz, D., Bottou, L., Scholkopf, B., Vapnik, V.: Unifying distillation and privileged information. In: ICLR (2016).
Martinez, J., Hossain, R., Romero, J., Little, J.J.: A simple yet effective baseline for 3D human pose estimation. In: ICCV (2017).
Mehta, D., Sotnychenko, O., Mueller, F., Xu, W., Sridhar, S., Pons-Moll, G., Theobalt, C.: Single-shot multi-person 3D pose estimation from monocular RGB. In: 3DV (2018).
Mehta, D., Sridhar, S., Sotnychenko, O., Rhodin, H., Shafiei, M., Seidel, H.P., Xu, W., Casas, D., Theobalt, C.: VNect: Real-time 3D human pose estimation with a single RGB camera. ACM Transactions on Graphics (2017).
Moon, G., Chang, J.Y., Lee, K.M.: Camera distance-aware top-down approach for 3D multi-person pose estimation from a single RGB image. In: ICCV (2019).
Mueller, F., Bernard, F., Sotnychenko, O., Mehta, D., Sridhar, S., Casas, D., Theobalt, C.: GANerated hands for real-time 3D hand tracking from monocular RGB. In: CVPR (2018).
Paszke, A., Gross, S., Massa, F., Lerer, A., Bradbury, J., Chanan, G., Killeen, T., Lin, Z., Gimelshein, N., Antiga, L., Desmaison, A., Kopf, A., Yang, E., DeVito, Z., Raison, M., Tejani, A., Chilamkurthy, S., Steiner, B., Fang, L., Bai, J., Chintala, S.: Pytorch: An imperative style, high-performance deep learning library. In: NeurIPS 2019.
Pavlakos, G., Choutas, V., Ghorbani, N., Bolkart, T., Osman, A.A., Tzionas, D., Black, M.J.: Expressive body capture: 3D hands, face, and body from a single image. In: CVPR (2019).
Pavlakos, G., Zhou, X., Derpanis, K.G., Daniilidis, K.: Coarse-to-fine volumetric prediction for single-image 3D human pose. In: CVPR (2017).
Ren, S., He, K., Girshick, R., Sun, J.: Faster R-CNN: Towards real-time object detection with region proposal networks. In: NIPS (2015).
Rogez, G., Schmid, C.: Mocap-guided data augmentation for 3D pose estimation in the wild. In: NIPS (2016).
Rogez, G., Weinzaepfel, P., Schmid, C.: LCR-Net++: Multi-person 2D and 3D pose detection in natural images. IEEE trans. PAMI (2019).
Romero, J., Tzionas, D., Black, M.J.: Embodied hands: modeling and capturing hands and bodies together. ACM Transactions on Graphics (2017).
Spurr, A., Song, J., Park, S., Hilliges, O.: Cross-modal deep variational hand pose estimation. In: CVPR (2018).
Supani, U.S., Rogez, G., Yang, Y., Shotton, J., Ramanan, D.: Depth-based hand pose estimation: Methods, data, and challenges. International Journal of Computer Vision (2018).

(56) References Cited

OTHER PUBLICATIONS

Vapnik, V., Izmailov, R.: Learning using privileged information: Similarity control and knowledge transfer. JMLR (2015).
Varol, G., Romero, J., Martin, X., Mahmood, N., Black, M.J., Laptev, I., Schmid, C.: Learning from synthetic humans. In: CVPR (2017).
Wu, Y., Ji, Q.: Facial landmark detection: a literature survey. International Journal of Computer Vision (2019).
Xiang, D., Joo, H., Sheikh, Y.: Monocular total capture: Posing face, body, and hands in the wild. In: CVPR (2019).
Xiong, P., Li, G., Sun, Y.: Combining local and global features for 3D face tracking. In: ICCV Workshops (2017).
Yang, L., Li, S., Lee, D., Yao, A.: Aligning latent spaces for 3D hand pose estimation. In: ICCV (2019).
Zadeh, A., Baltrusaitis, T., Morency, L.P.: Convolutional experts constrained local model for facial landmark detection. In: CVPR Workshop (2017).
Zafeiriou, S., Chrysos, G., Roussos, A., Ververas, E., Deng, J., Trigeorgis, G.: The 3D menpo facial landmark tracking challenge. In: ICCV Workshops (2017).
Zhang, J., Jiao, J., Chen, M., Qu, L., Xu, X., Yang, Q.: A hand pose tracking benchmark from stereo matching. In: ICIP (2017).
Zhang, X., Li, Q., Mo, H., Zhang, W., Zheng, W.: End-to-end hand mesh recovery from a monocular RGB image. In: ICCV (2019).
Zhu, X., Liu, X., Lei, Z., Li, S.Z.: Face alignment in full pose range: A 3d total solution. IEEE trans. PAMI (2017).
Zimmermann, C., Brox, T.: Learning to estimate 3D hand pose from single RGB images. In: ICCV (2017).
Japanese Office Action for Japanese Application No. 2021-092479 dated Jul. 19, 2022.

* cited by examiner

DISTILLATION OF PART EXPERTS FOR WHOLE-BODY POSE ESTIMATION

FIELD

The present disclosure relates to image processing and more particularly to two dimensional and three dimensional pose estimation of whole bodies of humans in images.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Images (digital images) from cameras are used in many different ways. For example, objects can be identified in images, and a navigating vehicle can travel while avoiding the objects. Images can be matched with other images, for example, to identify of a human captured within an image. There are many more other possible uses for images taken using cameras.

A mobile device may include one or more cameras. For example, a mobile device may include a camera with a field of view covering an area where a user would be present when viewing a display (e.g., a touchscreen display) of the mobile device. This camera may be referred to as a front facing (or front) camera. The front facing camera may be used to capture images in the same direction as the display is displaying information. A mobile device may also include a camera with a field of view facing the opposite direction as the camera referenced above. This camera may be referred to as a rear facing (or rear) camera. Some mobile devices include multiple front facing cameras and/or multiple rear facing cameras.

SUMMARY

In a feature, a system for generating whole body poses includes: a body regression module configured to generate a first pose of a body of an animal in an input image by regressing from a stored body anchor pose; a face regression module configured to generate a second pose of a face of the animal in the input image by regressing from a stored face anchor pose; an extremity regression module configured to generate a third pose of an extremity of the animal in the input image by regressing from a stored extremity anchor pose; and a pose module configured to generate a whole body pose of the animal in the input image based on the first pose, the second pose, and the third pose.

In further features, the pose module is configured to generate the whole body pose by: connecting a first keypoint of the first pose of the body with a second keypoint of the second pose of the face; and connecting a third keypoint of the first pose of the body with a fourth keypoint of the third pose of the extremity.

In further features, the whole body pose is two dimensional.

In further features, the whole body pose is three dimensional.

In further features: an image classification module is configured to receive the input image and to generate classifications for boxes of pixels in the input image; and a regional proposal network (RPN) module configured to generate the boxes based on an input from the image classification module.

In further features, the image classification module includes a ResNet-50 model.

In further features, the input is an output of a third block of the ResNet-50 model.

In further features, the classifications are selected from a group consisting of a body classification, a face classification, and a hand classification.

In further features: the body regression module is configured to generate the first pose of the body of a human based on first ones of the boxes having the body classification; the face regression module is configured to generate the second pose of the face of the human based on second ones of the boxes having the body classification; and the extremity regression module is configured to generate the third pose of a hand of the human based on third ones of the boxes having the hand classification.

In further features, the RPN module is configured to generate the boxes using a region of interest (ROI) alignment algorithm.

In further features, the body pose includes a pose of a torso of a human, a leg of the human, and an arm of the human.

In further features, an animation module is configured to generate an image including an animated avatar based on the whole body pose of a human in the input image.

In further features, a display control module is configured to display the image including the animated avatar on a display.

In further features, a camera is configured to capture the input image.

In further features: a body classification module is configured to determine body scores based on comparisons of the body of a human in the input image with a plurality of stored body anchor poses, where the body regression module is configured to select the stored body anchor pose from the plurality of stored body anchor poses based on the body scores; a face classification module is configured to determine face scores based on comparisons of the face of the human in the input image with a plurality of stored face anchor poses, where the face regression module is configured to select the stored face anchor pose from the plurality of stored face anchor poses based on the face scores; and a hand extremity classification module is configured to determine hand extremity scores based on comparisons of a hand of the human in the input image with a plurality of stored hand anchor poses, where the extremity regression module is a hand extremity regression module configured to, based on the hand scores, select the stored hand anchor pose from the plurality of stored extremity anchor poses that are hand anchor poses.

In further features: the body regression module is configured to select the stored body anchor pose from the plurality of stored body anchor poses based on the body score of the stored body anchor pose being higher than the body scores of all of the other ones of the stored body anchor poses; the face regression module is configured to select the stored face anchor pose from the plurality of face anchor poses based on the face score of the stored face anchor pose being higher than the face scores of all of the other ones of the stored face anchor poses; and the hand extremity regression module is configured to select the stored hand anchor pose from the plurality of hand anchor poses based on the hand score of the stored hand anchor pose being higher than the hand scores of all of the other ones of the stored hand anchor poses.

In further features, a training system includes a training module configured to: train a body expert including the body classification and regression modules based on a first dataset including images including bodies of humans; train a face expert including the face classification and regression modules based on a second dataset including images including faces of humans; and train a hand extremity expert including the hand extremity classification and regression modules based on a third dataset including images including hands of humans.

In further features, the training module is further configured to train the pose module by distilling data from the body expert, the face expert, and the hand extremity expert.

In a feature, a system for generating whole body poses includes: a body classification module configured to determine body scores based on comparisons of a body of a human in an input image with stored body anchor poses; a body regression module configured to: select one of the stored body anchor poses based on the body scores; and generate a first pose of the body in the input image by regressing the selected one of the stored body anchor poses; a face classification module configured to determine face scores based on comparisons of a face of the human in the input image with stored face anchor poses; a face regression module configured to: select one of the stored face anchor poses based on the face scores; and generate a second pose of the face in the input image by regressing the selected one of the stored face anchor poses; a hand classification module configured to determine hand scores based on comparisons of a hand of the human in the input image with stored hand anchor poses; a hand regression module configured to: select one of the stored hand anchor poses based on the hand scores; and generate a third pose of the hand in the input image by regressing the selected one of the stored hand anchor poses; and a pose module configured to generate a whole body pose of the human in the input image based on the first pose of the body, the second pose of the face, and the third pose of the hand.

In a feature, a method of generating whole body poses includes: by one or more processors, generating a first pose of a body of an animal in an input image by regressing from a stored body anchor pose; by the one or more processors, generating a second pose of a face of the animal in the input image by regressing from a stored face anchor pose; by the one or more processors, generating a third pose of an extremity of the animal in the input image by regressing from a stored extremity anchor pose; and by the one or more processors, generating a whole body pose of the animal in the input image based on the first pose, the second pose, and the third pose.

In further features: the animal is a human; the first pose is a pose of a body of the human; the second pose is a pose of a face of the human; and the third pose is a pose of a hand of the human.

In a feature, a system for generating whole body poses includes: a means for generating a first pose of a body of an animal in an input image by regressing from a stored body anchor pose; a means for generating a second pose of a face of the animal in the input image by regressing from a stored face anchor pose; a means for generating a third pose of an extremity of the animal in the input image by regressing from a stored extremity anchor pose; and a means for generating a whole body pose of the animal in the input image based on the first pose, the second pose, and the third pose.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure will become more fully understood from the detailed description and the accompanying drawings, wherein.

In the drawings, reference numbers may be reused to identify similar and/or identical elements.

DETAILED DESCRIPTION

The present application involves generating two-dimensional (2D) and three dimensional (3D) whole body poses of humans captured in images. The whole body poses include a body pose, a face pose, and a hand pose. The body pose includes a torso, arms, and legs. 2D pose estimation involves estimating which pixel includes each keypoint corresponding to human joints. 3D pose estimation involves determining the coordinate in the 3D world centered with respect to an origin center which may be different for the body. The body center may be approximately in the middle of the torso. The wrist may be approximately the center of the hand, and the face center may be approximately the center of the face.

Training datasets may be available for poses of hands, faces, and bodies. Training a model to estimate a whole body pose based on these training datasets, however, may provide poor performance due to the training datasets being for specific body parts and unannotated parts being considered negatively.

The present application involves training independent experts for each body part namely a body expert, a hand expert, and a face expert, and distilling the knowledge of the experts to generate a model configured to jointly generate whole-body poses. Given a training image with partial or no annotation, each part expert detects and estimates its subset of keypoints (or key points), in 2D and/or 3D, and resulting estimations are combined to obtain whole-body pseudo ground-truth poses for the model that jointly generates whole-body poses. A distillation loss is applied on the models output to keep it close to the experts' predictions.

Figure 1:
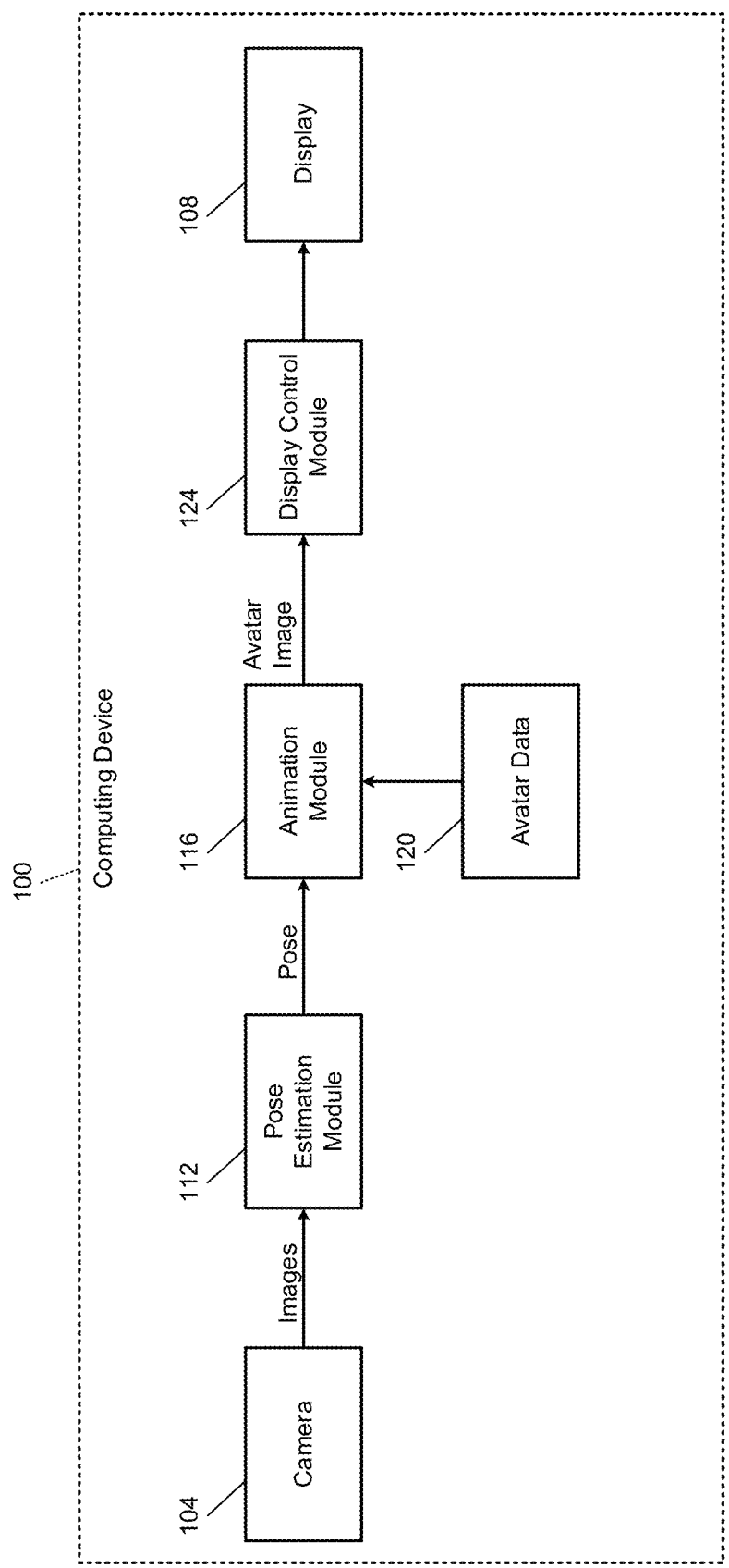
FIG. 1 is a functional block diagram of an example computing device.

FIG. 1 is a functional block diagram of an example implementation of a computing device 100. The computing device 100 may be, for example, a smartphone, a tablet device, a laptop computer, a desktop computer, or another suitable type of computing device.

A camera 104 is configured to capture images. A series of images may be used to generate video, such as for display on a display 108. For some types of computing devices, the camera 104, the display 108, or both may not be included in the computing device 100. The camera 104 may be a front facing camera or a rear facing camera. While only one camera is shown, the computing device 100 may include multiple cameras, such as at least one rear facing camera and at least one forward facing camera.

A pose estimation module 112 generates at least one of a two-dimensional (2D) and a three dimensional (3D) pose of a human in an image. The image may be, for example, an image from the camera 104, an image stored in memory of the computing device 100, or an image received from another computing device, such as via a network (e.g., the Internet). The camera 104 may capture images at a predetermined rate (e.g., corresponding to 60 Hertz (Hz), 120 Hz, etc.), for example, to produce video. In the example of images from the camera 104, the pose estimation module 112 may update the pose for each new image received.

Each pose generated by the pose estimation module 112 includes a body pose, a face pose, and one or two hand poses, when a face, a body, and one or two hands are present in the image used to generate the pose. The hand poses, the body pose, and the face pose are connected (e.g., in wire frame via keypoints) in the pose generated by the pose estimation module 112. The pose estimation module 112 and training of the pose estimation module 112 are discussed further below.

An animation module 116 may generate animated images, such as avatar images (images including an avatar), based on the poses, respectively, and animation data, such as avatar data 120. The avatar may have high fidelity and high detail. The avatar data 120 may be stored in memory and includes data for generating an avatar and posing the avatar the same way as in the pose. Avatars include animated representations a person, such as in images or video.

The animation module 116 may update the animated image for each new pose generated, such as to generate animated video including the avatar. Details of the hand and face poses may provide increased expressivity of the avatar as they carry information on emotions or fine body language.

A display control module 124 (e.g., including a display driver) displays the animated image on the display 108. The display control module 124 may update what is displayed at the predetermined rate to display video on the display 108. In various implementations, the display 108 may be a touchscreen display or a non-touch screen display.

While the example of use of the poses to generate animated images is provided, the present application is also applicable to other uses of the poses. For example, the poses of a human may be tracked and used to train motion of a robot and actuation of a gripping element. For example, whole body poses carry information on both the arm and the fingers, which may allow for fine-tuned gesture control of devices. Detecting both global postures and the hand poses can allow robots to be trained from humans, such as how to move within a scene, how to grasp objects, etc.

Detecting facial pose may enable determination of the direction in which a human is looking, who is talking in a scene, sentiment recognition, etc. There are numerous other uses of the poses. For example, whole body poses can be applied or used in the context of imaging and video indexing, such as to detect actions in videos, which may be used for video indexing. As another example, whole body poses can be used to allow virtual trying on of clothing. As another example, locations and movement of humans can be identified and can be used by a vehicle as objects to avoid.

Figure 2:
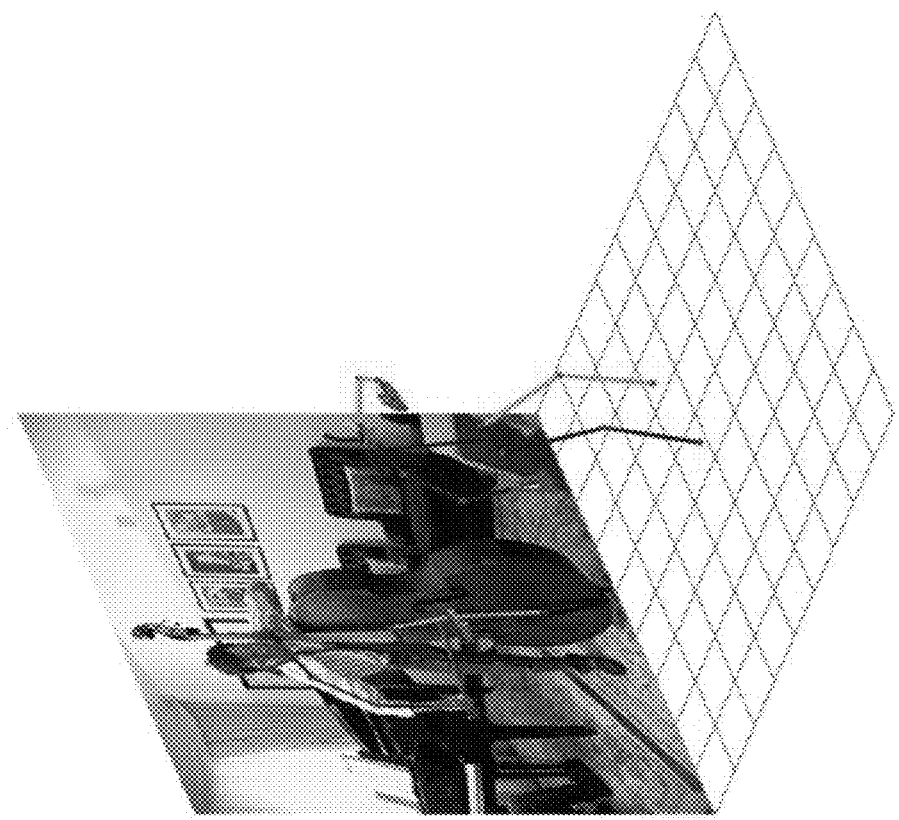
FIG. 2 includes examples of 2D poses and 3D whole body poses generated based on input images.
Figure 2:
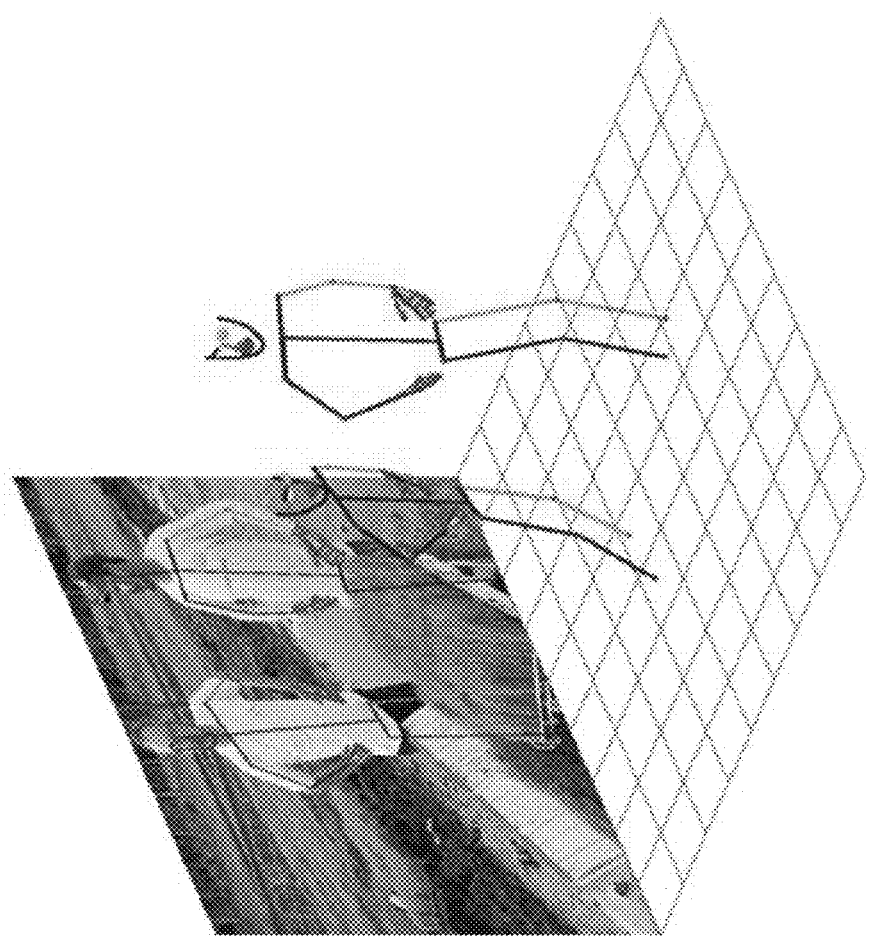

Examples of 2D poses (presented on the images) and 3D poses (projected in front of the images) generated by the pose estimation module 112 based on input image are provided in FIG. 2.

Figure 3:
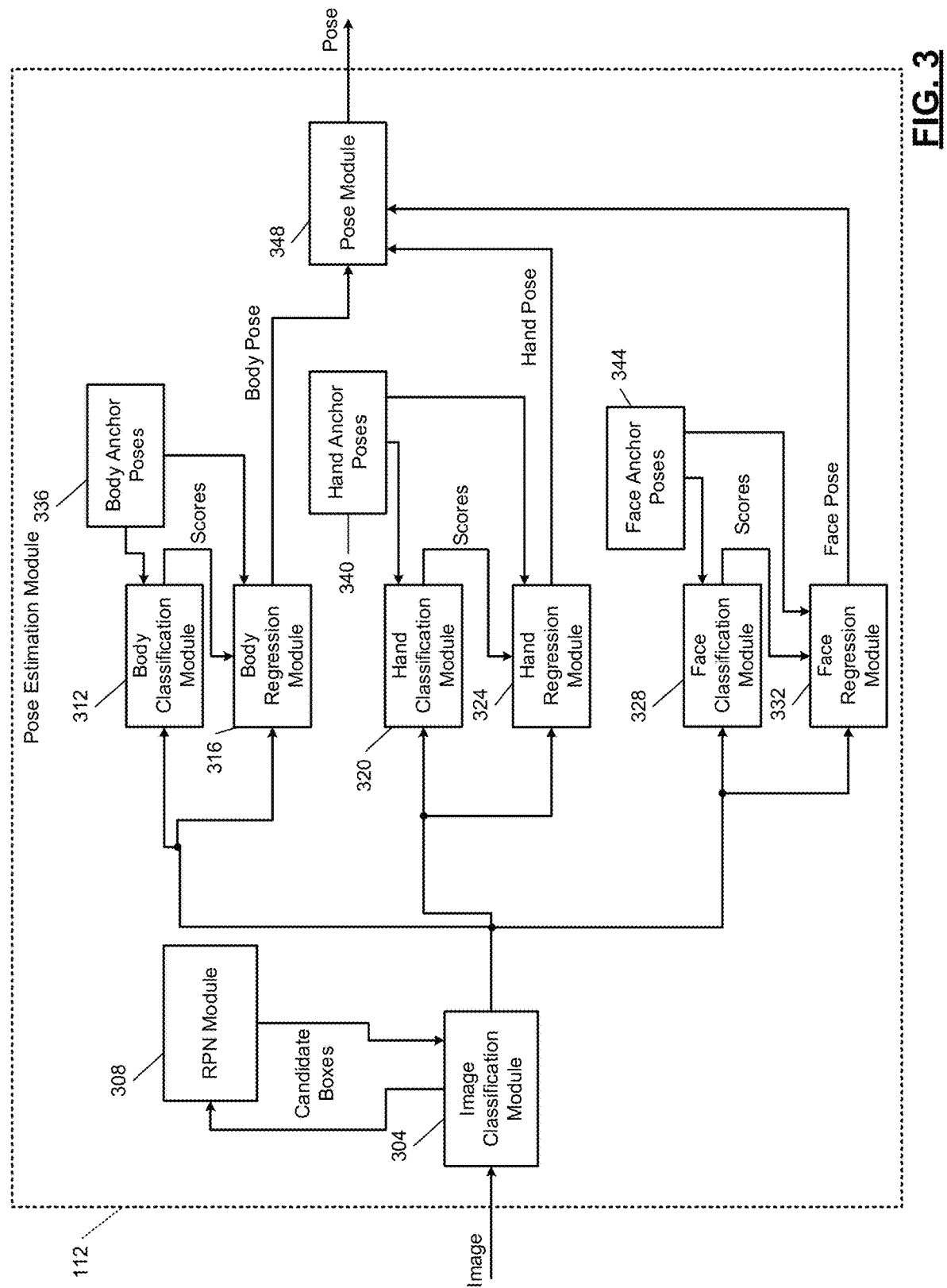
FIG. 3 is a functional block diagram of an example implementation of a pose estimation module.

FIG. 3 is a functional block diagram of an example implementation of the pose estimation module 112. Images are input to an image classification module 304. The image classification module 304 includes a convolutional neural network (CNN) that, based on an input image, produces convolutional features (e.g., vector representations). The image classification module 304 may include, for example, the ResNet50 image classification algorithm or another suitable type of image classification algorithm. Up to block3 (or the third stage) of the ResNet50 algorithm may be used to produce the convolutional features.

The convolutional features are provided to a regional proposal network (RPN) module 308. Based on the convolutional features, the RPN module 308 generates a list of candidate boxes. Each candidate box includes at least one of a possible instance of a body of a human, a possible instance of a hand of a human, and a possible instance of a face of a human. While a hand, a body, and a face may belong to the same human, the parts are treated as separate objects to be robust to instances when only a face, only a hand, only a body, or only two of a face, a hand, and a body are present in an image. Images, however, may include more than one human, and candidate boxes for more than one human may be identified. In other words, poses may be generated for multiple humans if multiple humans are included in an image.

The candidate boxes generated by the RPN module 308 are used by the image classification module 304 to pool convolutional features using a region of interest (ROI) alignment algorithm, such as RoI Align. The remaining blocks (or stages) of the ResNet50 algorithm produces a final convolutional output. The final convolutional output is fed to respective classification branches.

The final convolutional output is input to a body classification module 312, a body regression module 316, a hand classification module 320, a hand regression module 324, a face classification module 328, and a face regression module 332. Classification is performed for the three different sub tasks: body, hand, and face classification. Pose classifications are defined by clustering in the 3D pose space. The clustering is applied independently in the 3 pose spaces corresponding to the 3 parts (body, hand, face), obtaining a set of $K_B$, $K_H$, and $K_F$ classes for bodies, hands, and faces. To handle left and right hands with the same detector, $2 \times K_H$ hand classes may be considered, $K_H$ for each hand.

For each classification branch (and module), additional background classes may be considered to use the classifier as a detector. Each candidate box is classified into $K_B+1$ labels for body classes, $2K_H+1$ for hands, and $K_F+1$ for faces.

The body classification module 312 generates classifications based on the final convolutional output. The pose classes are defined by clustering in the 3D pose space a training set of poses. This results in the set of $K_B$ classes for bodies. The body regression module 316 applies a class specific regression to estimate body pose in 2D and 3D. First, for each class of the body, body anchor poses 336 are defined and stored. The body anchor poses 336 may be determined as the average of 2D and 3D poses over all elements in the corresponding cluster. The body regression module 316 fits all of the 2D body anchor poses 336 to each of the candidate boxes. The body regression module 316 performs class-specific regressions to deform the body anchor poses 336 to match the actual 2D and 3D pose (in the image) in each box. The body regression module 316 produces $5 \times J_B \times K_B$ outputs for the body in the image. The number 5 corresponds to the number of dimensions (2D+3D). JB is the number of keypoints for the body pose.

The body regression module 316 may also perform one or more post processing functions. For the body, multiple proposals (e.g., body anchor poses 336) can overlap and produce a valid (pose) prediction. The body regression module 316 may combine these poses based on at least one of their 2D overlap, 3D similarity, and classification scores.

The hand classification module 320 generates classifications based on the final convolutional output. The pose classes are defined by clustering in the 3D pose space a training set of poses. This results in the set of $K_H$ classes for hand. The hand regression module 324 applies a class specific regression to estimate hand pose in 2D and 3D. First, for each class of the hand, hand anchor poses 340 are defined and stored. The hand anchor poses 340 may be determined as the average of 2D and 3D poses over all elements in the corresponding cluster. The hand regression module 324 fits all of the 2D hand anchor poses 340 to each of the candidate boxes. The hand regression module 324 performs class-specific regressions to deform the hand anchor poses 336 to match the actual 2D and 3D pose (in the image) in each box. The hand regression module 324 produces $5 \times 2 \times J_H \times K_H$ outputs for the hands in the image. Again, the number 5 corresponds to the number of dimensions (2D+3D). The number 2 is for two hands (a left hand and a right hand). $J_H$ is the number of keypoints for one hand pose.

The hand regression module 324 may also perform one or more post processing functions. For the hand, multiple proposals (e.g., hand anchor poses 340) can overlap and produce a valid (pose) prediction. The hand regression module 324 may combine these poses based on at least one of their 2D overlap, 3D similarity, and classification scores.

The face classification module 328 generates classifications based on the final convolutional output. The pose classes are defined by clustering in the 3D pose space a training set of poses. This results in the set of $K_F$ classes for face. The face regression module 332 applies a class specific regression to estimate face pose in 2D and 3D. First, for each class of the face, face anchor poses 340 are defined and stored. The face anchor poses 344 may be determined as the average of 2D and 3D poses over all elements in the corresponding cluster. The face regression module 332 fits all of the 2D face anchor poses 344 to each of the candidate boxes. The face regression module 332 performs class-specific regressions to deform the face anchor poses 344 to match the actual 2D and 3D pose (in the image) in each box. The face regression module 332 produces $5 \times J_F \times K_F$ outputs for the face in the image. Again, the number 5 corresponds to the number of dimensions (2D+3D). $J_F$ is the number of keypoints of a face pose.

The face regression module 332 may also perform one or more post processing functions. For the face, multiple proposals (e.g., face anchor poses 344) can overlap and produce a valid (pose) prediction. The face regression module 332 may combine these poses based on at least one of their 2D overlap, 3D similarity, and classification scores.

Generally speaking, the classification modules compare the respective inputs with the anchor poses. The classification modules may generate scores based on the comparisons of the respective inputs with the respective anchor poses. The score for an anchor pose may increase as similarity between the respective input and that anchor pose increases, and vice versa. Example scores are illustrated by the bar graphs in FIG. 4. The regression modules 316 may select the one of the respective anchor poses with the highest score and regress the respective inputs based on the selected anchor pose. The result of the regression produces the respective body, hand, and face poses.

A pose module 348 connects the body, hand, and face poses to produce the whole body pose for the image. The body pose includes a pose of a torso, one or more arms, and one or more legs. The body pose includes a head keypoint where the body pose corresponding to where a human head connects to a human body. The body pose also includes arm keypoints where human arms connect to the human hands. The head pose includes a head keypoint where a human head connects to a human body. The hand poses include hand keypoints where human hands connect to human arms.

The pose module 348 connects the head keypoint of the body pose with the head keypoint of the head pose, such as using a straight line in the 2D or 3D space. The pose module 348 connects the arm keypoints of the body pose with the arm keypoints of the hand poses, such as using straight lines in the 2D or 3D space. Example 2D and 3D whole body poses are provided in FIG. 2. The pose estimation module 112 uses a localization-classification-regression network where the objects to be detected are bodies, hands, and faces with respectively $J_B$, $J_H$, and $J_F$ keypoints estimated in 2D and 3D. The body pose may include at least 8 keypoints. The face pose may include at least 8 keypoints. The hand pose may include at least 6 keypoints.

Figure 4:
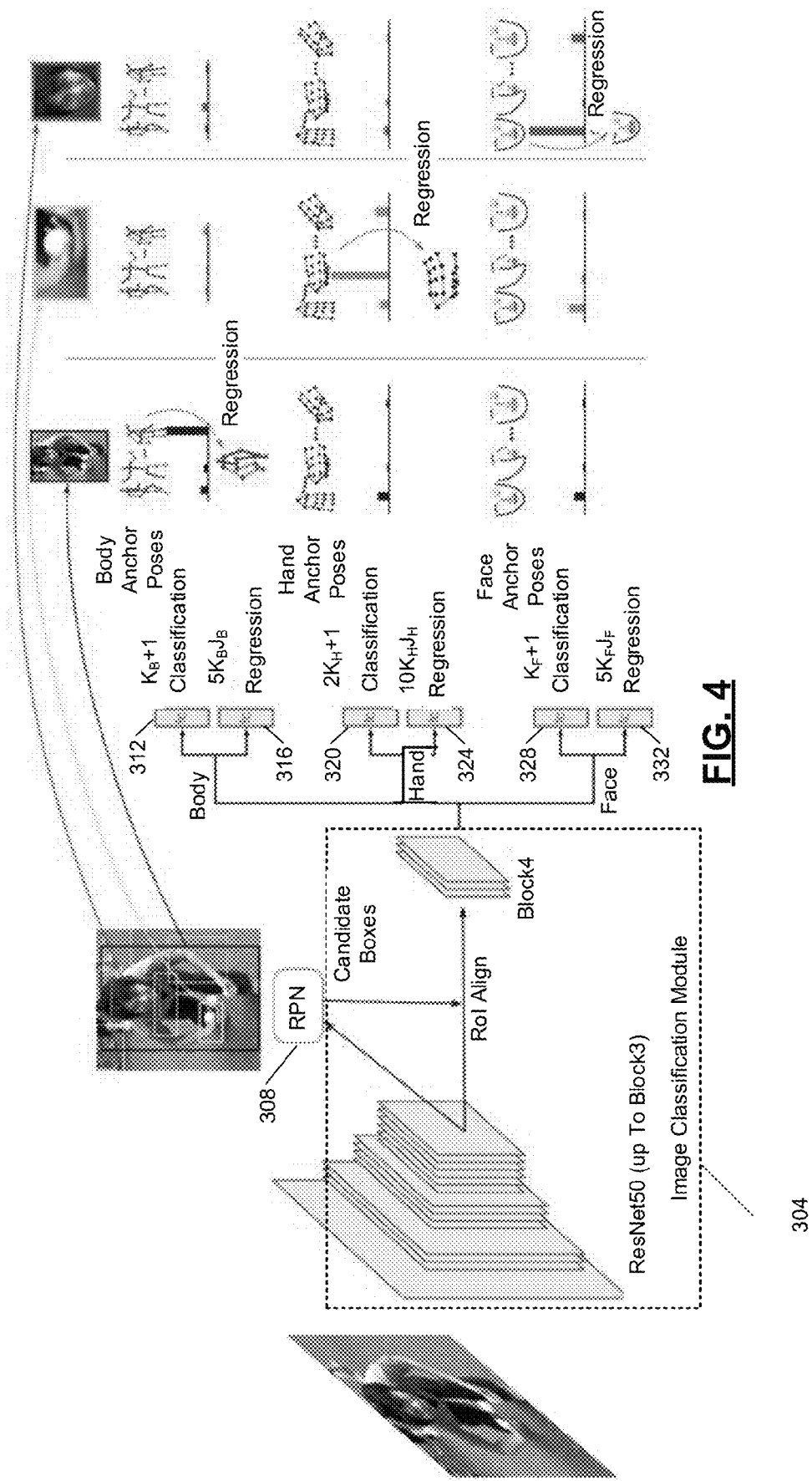
FIG. 4 is a functional block diagram of an example implementation portion of the pose estimation module of FIG. 3.

FIG. 4 is another functional block diagram of the example implementation of the pose module 112. FIG. 4 also illustrates example candidate boxes, example body, hand, and face anchor poses, and example body, hand, and face poses regressed from selected body anchor poses.

Figure 5:
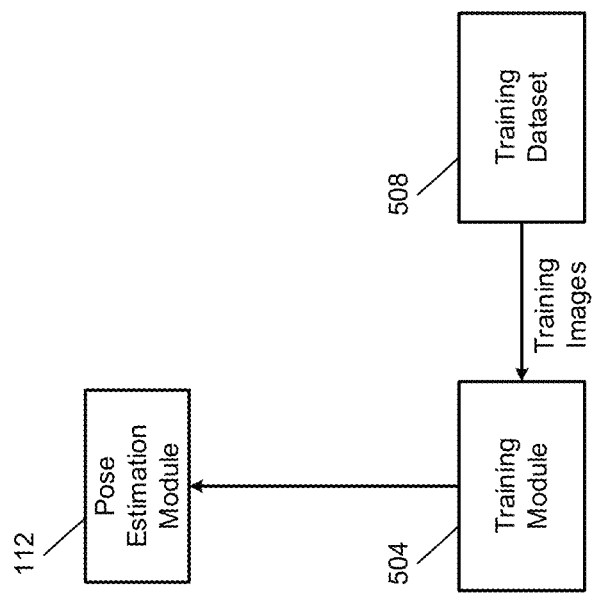
FIG. 5 is a functional block diagram of an example training system.

FIG. 5 is a functional block diagram of an example training system. A training module 504 trains the pose estimation module 112 using a training dataset 508. The training module 504 includes body, hand, and face experts that are independently trained for each part, namely a body expert, a hand expert, and a face expert. The knowledge of the experts is distilled to train the pose estimation module 112 to jointly determine the whole body poses, as described above.

The training dataset 508 includes a hand training dataset, a body training dataset, and a face training dataset. The training datasets may or may not include annotations for their respective parts. In other words, the hand training dataset may include annotations regarding hand poses, the body training dataset may include annotations regarding body poses, and/or the face training dataset may include annotations regarding face poses. In various implementations, the annotations may be omitted. Regardless, however, the training datasets do not include annotations regarding poses of other parts. For example, the hand training dataset does not include annotations regarding body poses or face poses. The body training dataset does not include annotations regarding hand poses or face poses. The face training dataset does not include annotations regarding hand poses or body poses. Unannotated parts are considered as negatives for their true classes.

Figure 6A:
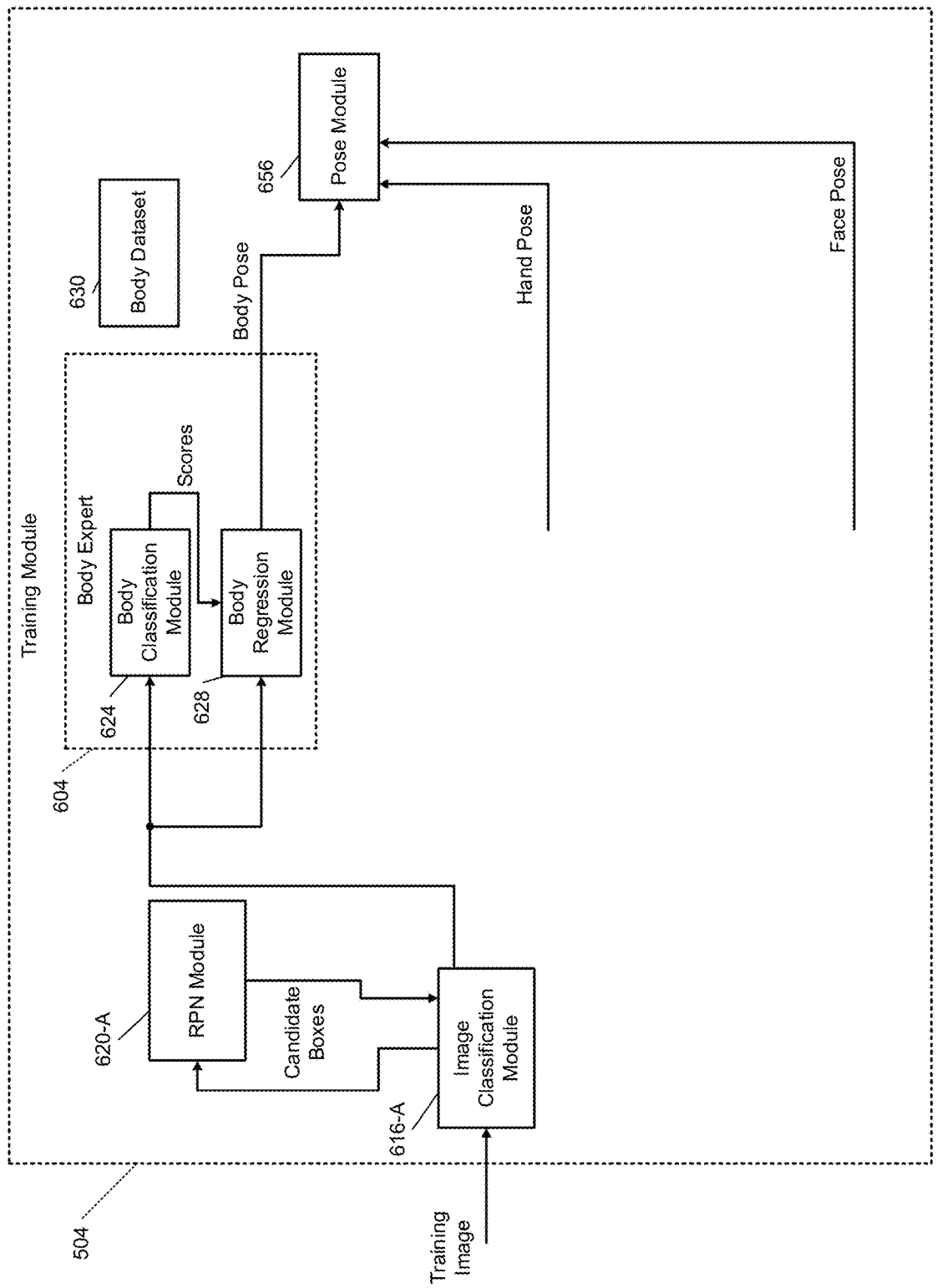
FIGS. 6A, 6B, and 6C are a functional block diagram of an example training module.
Figure 6B:
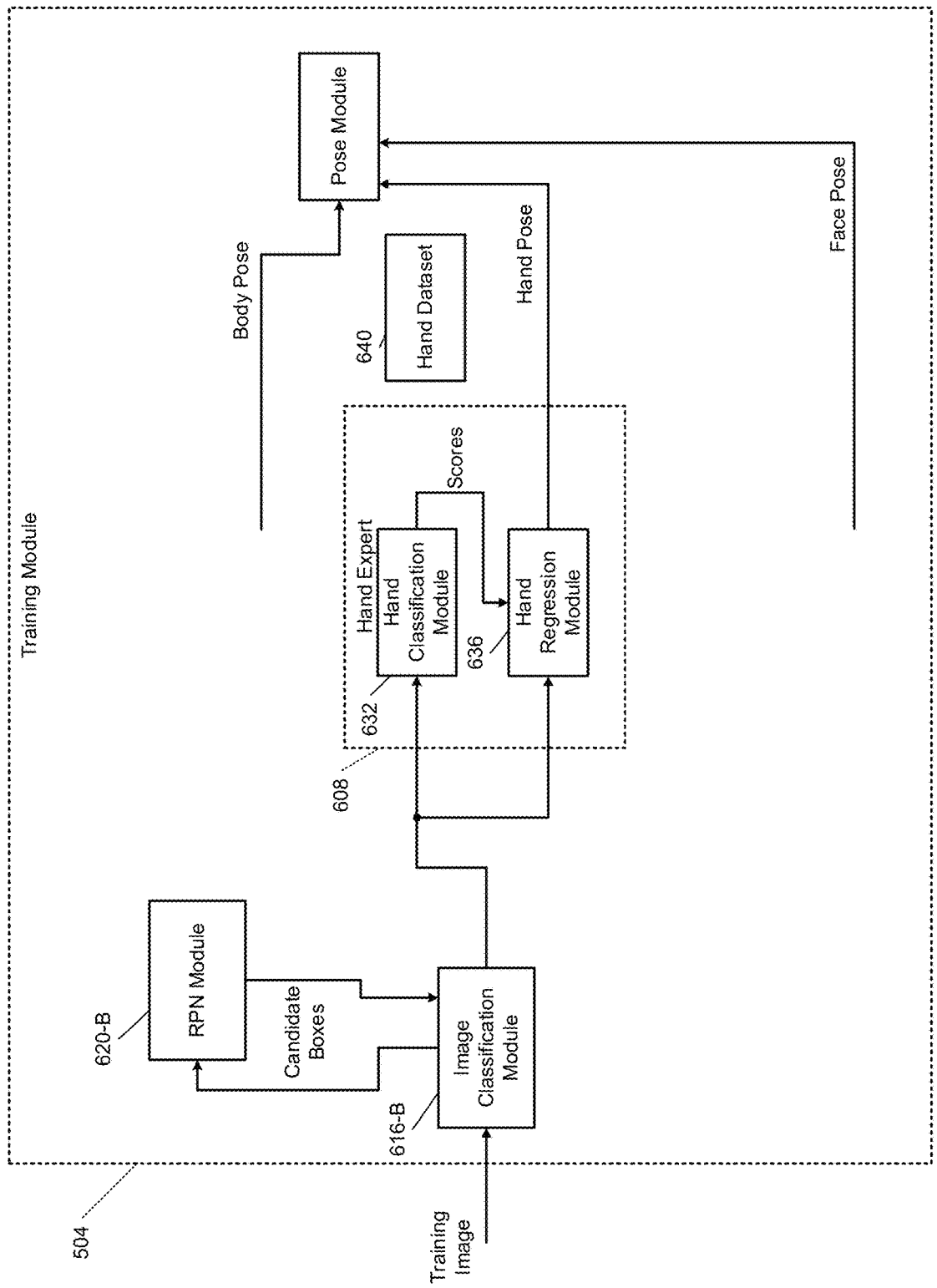
Figure 6C:
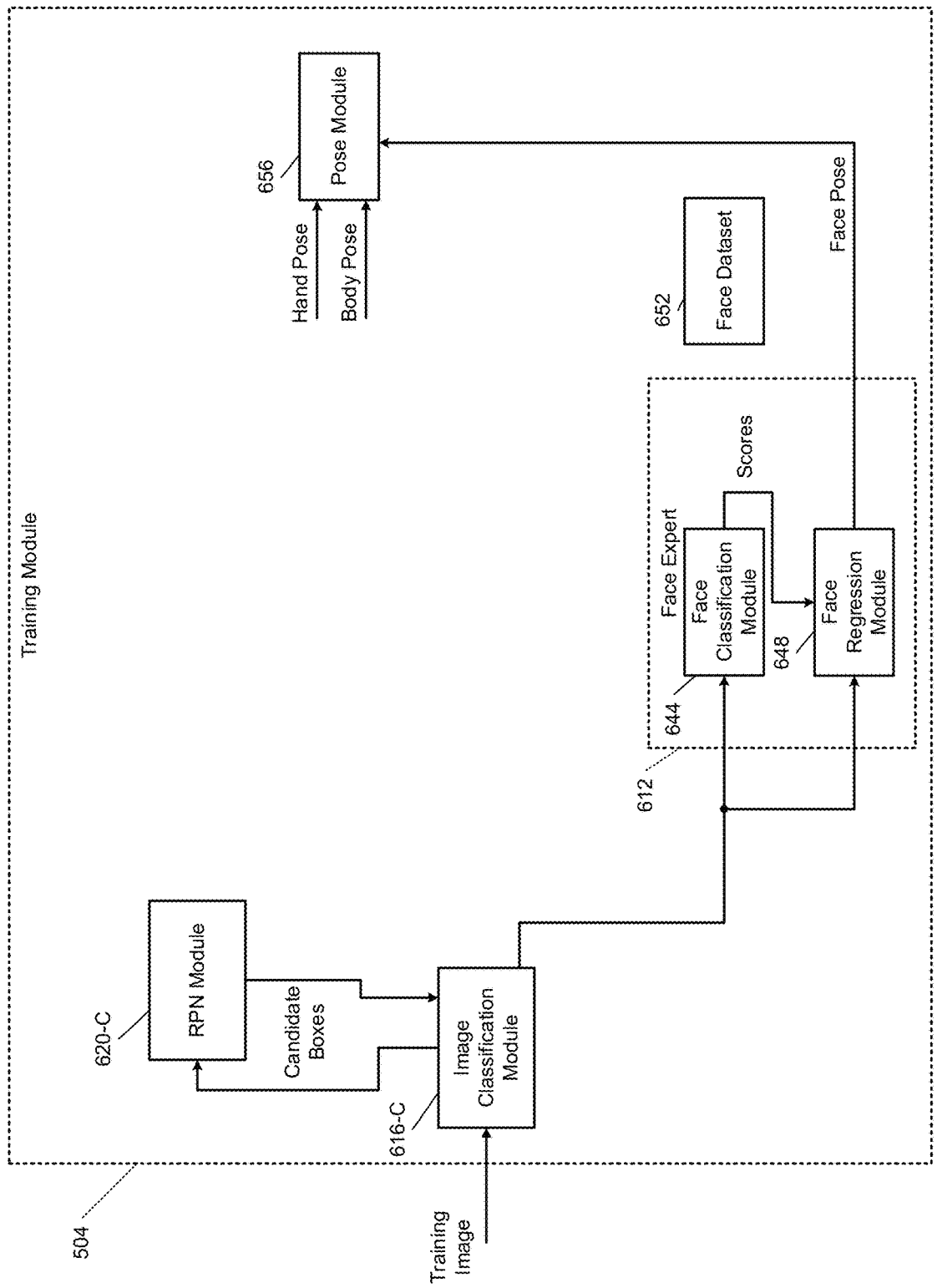

FIGS. 6A-6C are a functional block diagram of an example implementation of the training module 504. The training module 504 includes the same basic structure as the post estimation module 112. The training module 504 includes a body expert 604 (FIG. 6A), a hand expert 608 (FIG. 6B), and a face expert 612 (FIG. 6C). Image classification modules 616-A, 616-B, and 616-C and RPN modules 620-A, 620-B, and 620-C function the same way as the image classification module 304 and the RPN module 308, discussed above. Training images from the training dataset 508 are input to the training module 504.

The body expert 604 is configured to generate a pose of a body in the training image. The body expert 604 may include a body classification module 624 and a body regression module 628 that function the same way as the body classification module 312 and the body regression module 316 using a body dataset 630.

The hand expert 608 is configured to generate a pose of one or two hands in the training image. The hand expert 608 may include a hand classification module 632 and a body regression module 636 that function the same way as the body classification module 312 and the body regression module 316 using a hand dataset 640.

The face expert 612 is configured to generate a pose of a face in the training image. The face expert 612 may include a face classification module 644 and a face regression module 648 that function the same way as the face classification module 328 and the face regression module 332 using a face dataset 652. The body expert 604, the hand expert 608, and the face expert 612 are not updated/adjusted and therefore may be referred to as being frozen.

A pose module 656 is configured to generate a whole body pose for the training image from the body pose, the hand pose, and the face pose. The pose module 656 functions the same way as the pose module 348.

Figure 7:
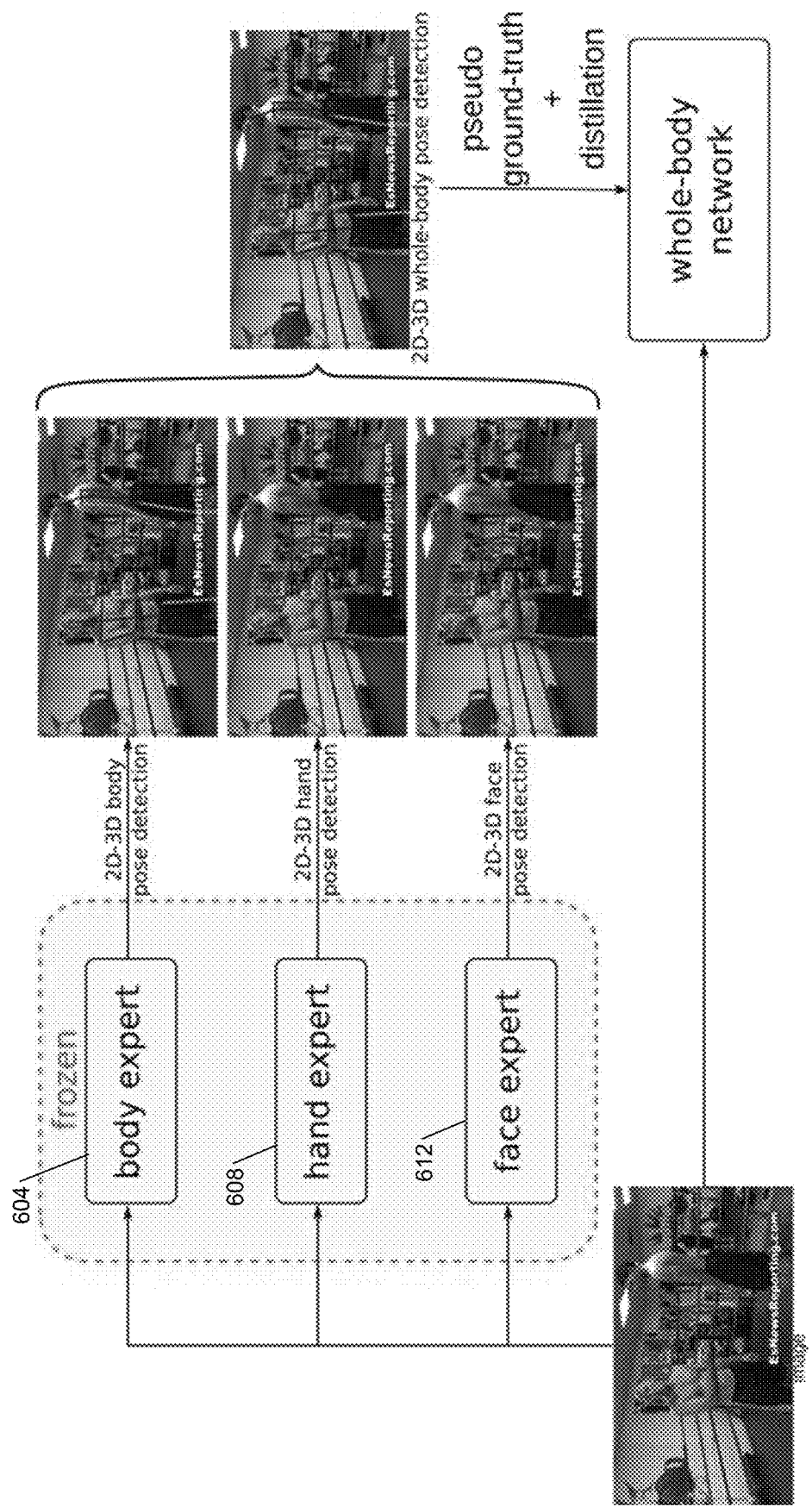
FIG. 7 is a functional block diagram of an example portion of the training module of FIG. 6.

FIG. 7 includes a functional block diagram including the body, hand, and face experts 604, 608, and 612. An example training image is also shown. FIG. 7 also includes example body, hand, and face poses (shown over the training image) generated by the body, hand, and face experts 604, 608, and 612 given the training image. FIG. 7 also includes an example whole body pose generated by the pose module 656.

To leverage the part specific datasets 630, 640, and 652, the training module 504 independently trains the experts of the pose estimation module 112 (each expert including a classification module and a regression module) and distills the knowledge of the experts to train the pose module 112 to generate the whole body poses jointly. The same number of classes and joints may be used for the training. For example, for the body, $J_B=13$ body joints may be used and $K_B=10$ classes may be used. For the face, $K_F=10$ classes may be used. For the face, the 84 landmarks (e.g., eyes, eyebrows, nose, lips, and facial contours) from the 3D face Tracking Menpo benchmark may be used. For the hand, $J_H=21$ joints may be used which corresponds to one keypoint for the wrist and 4 keypoints for each finger. $K_H=5$ classes (anchor poses) may be may be used for the hands.

The training module 504 distills the knowledge of the experts 604, 608, and 612 to the pose estimation module 656 (and ultimately the pose module 312). Let $\mathcal{B}$, $\mathcal{H}$, and $\mathcal{F}$ be the training datasets 630, 640, and 652 used for the three individual tasks, body, hand, and face pose detection. They are associated with ground-truth 2D and 3D pose annotations for bodies b, hands h, and faces f, respectively. In other words, the body expert 604 is trained on $\mathcal{B}=\{I_i, b_i\}_i$, i.e., a set of images $I_i$ with ground-truth annotations $b_i$. The hand and face experts 608 and 612 are trained similarly.

To train the pose estimation module 112 the training module 504 uses ground truth annotations w for the whole body. The poses detected by the experts 604, 608, and 612 during the training are used to augment the annotations of the part-specific datasets 630, 640, and 652. $\hat{b}_i$, $\hat{h}_i$, and $\hat{f}_i$ are the poses determined based on the images $I_i$ with the experts 604, 608, and 612 for bodies, hands, and faces, respectively. The training module 504 trains the pose module 656 (and the pose module 348 using the following $$\mathcal{W}_{DOPE} = \{I_i, w_i\}_{i \in \mathcal{B} \cup \mathcal{H} \cup \mathcal{F}}$$

where $$w_i = \begin{cases} b_i, \hat{h}_i, \hat{f}_i & \text{if } i \in \mathcal{B} \\ \hat{b}_i, h_i, \hat{f}_i & \text{if } i \in \mathcal{H} \\ \hat{b}_i, \hat{h}_i, f_i & \text{if } i \in \mathcal{F} \end{cases}$$

The poses $\hat{b}_i$, $\hat{h}_i$, and $\hat{f}_i$ determined by the experts 604, 608, and 612 are considered as pseudo ground-truth for the missing keypoints in 2D and 3D. The ground-truth annotations are completed using the poses, for example, when some annotations have been incorrectly labeled or are missing. Training images with no annotations can be used to train the network using only pseudo ground truth annotations, $w_i=\{\hat{b}_i, \hat{h}_i, \hat{f}_i\}$.

The loss $\mathcal{L}$ used to train the pose estimation module 112 combines the loss $\mathcal{L}_{RPN}$ with the sum of the three terms for each part p ∈ {body, hand, face}: (a) the loss for the classification branch (modules) $\mathcal{L}_{cls}^p$ (b) the loss for the regression branch (modules) $\mathcal{L}_{reg}^p$, and (c) a distillation loss $\mathcal{L}_{dist}^p$. This can be written as an equation as $$\mathcal{L} = \mathcal{L}_{RPN} + \Sigma p \in \{body, hand, face\} \mathcal{L}_{cls}^p + \mathcal{L}_{dist}^p + \mathcal{L}_{reg}^p.$$

The loss $\mathcal{L}_{RPN}$ of the RPN module 308 is a standard predetermined loss. The classification loss $\mathcal{L}_{cls}^p$ is for each part p is a softmax averaged over all boxes. If a box sufficiently overlaps with a ground-truth box, its ground truth label is obtained by finding the closest anchor pose from the ground truth pose. Otherwise, it may be assigned a background label, such as 0. The regression loss $\mathcal{L}_{reg}^p$ for each part is a L1 loss on the difference between the regressed 2D-3D pose and the ground truth 2D-3D pose for each box, averaged over all boxes. The training module 504 may train to minimize a distance between the regressed 2D-3D pose from the anchor pose and the ground-truth pose. Regression is class-specific, and the loss is only applied on the output of the regressor specific to the ground truth class for each positive box.

The distillation loss $\mathcal{L}_{dist}^p$ includes two loss components, one for the distillation of the classification scores $\mathcal{L}_{dist\_cls}^p$ and one for the regression $\mathcal{L}_{dist\_reg}^p$ and can be expressed as:

$$\mathcal{L}_{dist}^p = \mathcal{L}_{dist\_cls}^p + \mathcal{L}_{dist\_reg}^p.$$

Given a box, the distillation loss may make the output of the pose module 656 (and ultimately the pose module 348)

as close as possible to the output of the part expert p. The classification component $\mathcal{L}_{dist\_cls}^{p}$ may be a distillation loss between the predictions produced by the corresponding part expert and those estimated by the pose module 656 for the part p. In other words, the $\mathcal{L}_{dist\_cls}^{p}$ is the soft version of hard label loss $\mathcal{L}_{cls}^{p}$. The regression component $\mathcal{L}_{dist\_reg}^{p}$ is a L1 loss between the pose estimated by an expert for a part and the pose estimated by the pose module 656 for that part for the ground truth class. The pseudo ground truth pose is obtained by averaging all overlapping estimates made by the part expert. $\mathcal{L}_{reg}^{p}$ enforces regression of the pseudo ground truth pose while $\mathcal{L}_{dist\_reg}^{p}$ favors regression of the exact same pose predicted by the part expert for a given box.

The boxes (candidate boxes) proposed by the RPN module and the pose module 656 may be different. The boxes should include those produced by the entire pose estimation module 112. During training, the training module 504 augments the proposals of the pose module 656 with the positive boxes from the parts experts 604, 608, and 612 and determines the distillation losses based only on these boxes.

To summarize, given a training image, the training module 504: (a) runs each part expert, keeping its pose detections as well as a list of the positive boxes with classification probabilities and regression outputs, (b) runs the pose module 656 to determine a whole body pose given the outputs of the parts experts, adding the positive boxes from the parts experts to the list of proposals. The losses based on the pseudo-ground truths are averaged over all boxes while the distillation losses are averaged only over the positive boxes from the part experts. The training includes independently training each part expert first, which means using a body dataset, to train a body expert composed of the image classification+RPN+body classification+body regression on the body dataset, using a face dataset, to train a face expert composed of the image classification+RPN+face classification+face regression on the face dataset, and using a hand dataset, to train a hand expert composed of the image classification+RPN+hand classification+hand regression on the hand dataset. To train the whole-body network, the experts are frozen and are thus not adjusted with the losses and train only the whole-body network.

The training module 504 adjusts one or more characteristics to minimize the losses. The characteristics may be, for example, at least one characteristic of the body expert 604, at least one characteristic of the hand expert 608, at least one characteristic of the face expert 612, and at least one characteristic of the pose module 656. Once training is complete, the characteristics of the classification modules 624, 632, 644, the regression modules 628, 636, 648, and the pose module 656 are stored to the pose estimation module 112 for estimating whole body poses based on input images (e.g., in the wild images).

The body expert 604 may be trained by the training module 504 using a combination of MPII, COCO, LSP, LSPE, Human3.6M, and Surreal datasets. Pseudo 3D ground truths are obtained for 2D datasets using matching. The training module 504 may randomly perform horizontal flips (or other geometric transformations) on training images during the training of the body expert 604, such as for 50 epochs. The training module 504 may train the hand expert 608 using the RH dataset for 100 epochs. The training module 504 may perform data augmentation during training of the hand expert 608, such as color jittering, random horizontal flipping, and random perspective transformations. The training module 504 may generate $K_H=5$ anchor poses by clustering 3D poses of right hands and flipped left hands from the training dataset. The training module 504 may train the face expert 612 for 50 epochs on the 3D face tracking Menpo dataset with random horizontal flips and color jittering during training.

The training module 504 may include a ResNet50 backbone. The training may be 50 epochs using the union of the datasets of each part expert (the datasets 630, 640, and 652). The same data augmentation strategy may be used for the training of each of the part experts. The training module 504 may use stochastic gradient descent (SGD) with a momentum of, for example, 0.9, a weight decay of 0.0001, and an initial learning rate of 0.02. The learning rate may be divided by 10 after 30 and 45 epochs. Images may be resized such that the smallest image dimension is 800 pixels during training and testing and 1000 proposals are kept at testing.

The pose estimation module 112 (after training) may be executed using a T4 GPU (graphics processing unit) by Nvidia. The images may be reduced to 400 pixels and the number of box proposals may be limited to 50. This may allow the pose estimation module 112 to run at 40 milliseconds (ms) per image, corresponding to 25 frames per second in real time.

Figure 8:
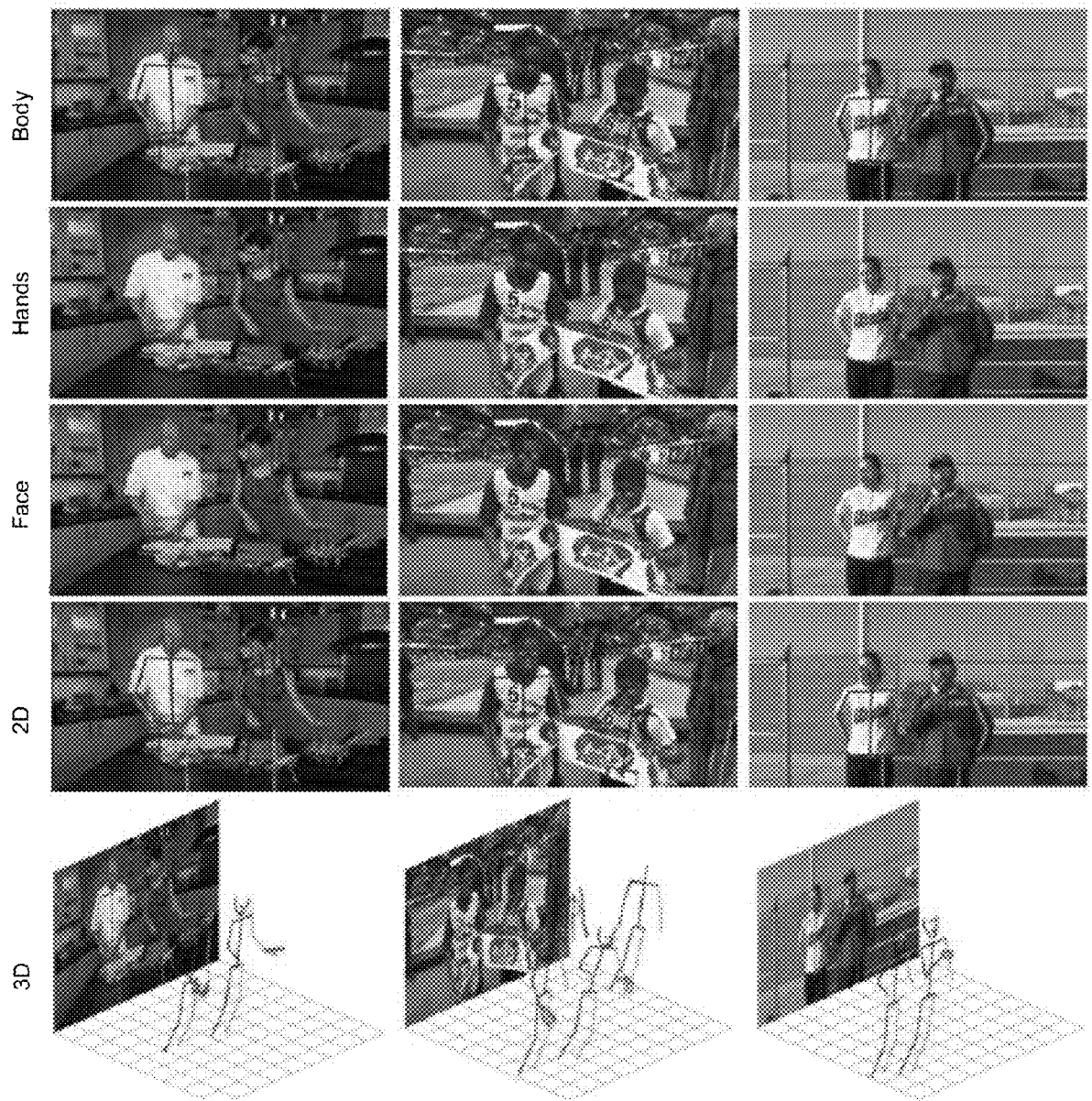
FIG. 8 includes examples of 2D and 3D poses generated based on input images.

The pose estimation module 112 provides comparable or better pose estimations than individual parts pose estimators yet also produces whole body pose estimations, which the individual parts pose estimators do not. The whole body pose estimations can be used, for example, to produce whole body (or a larger body section) avatar generation or for another suitable use. FIG. 8 includes examples of images input to the pose estimation module 112. The top three rows include examples of body, hand, and face poses estimated by the pose estimation module 112. The bottom two rows include 2D and 3D whole body poses estimated by the pose estimation module 112.

Figure 9:
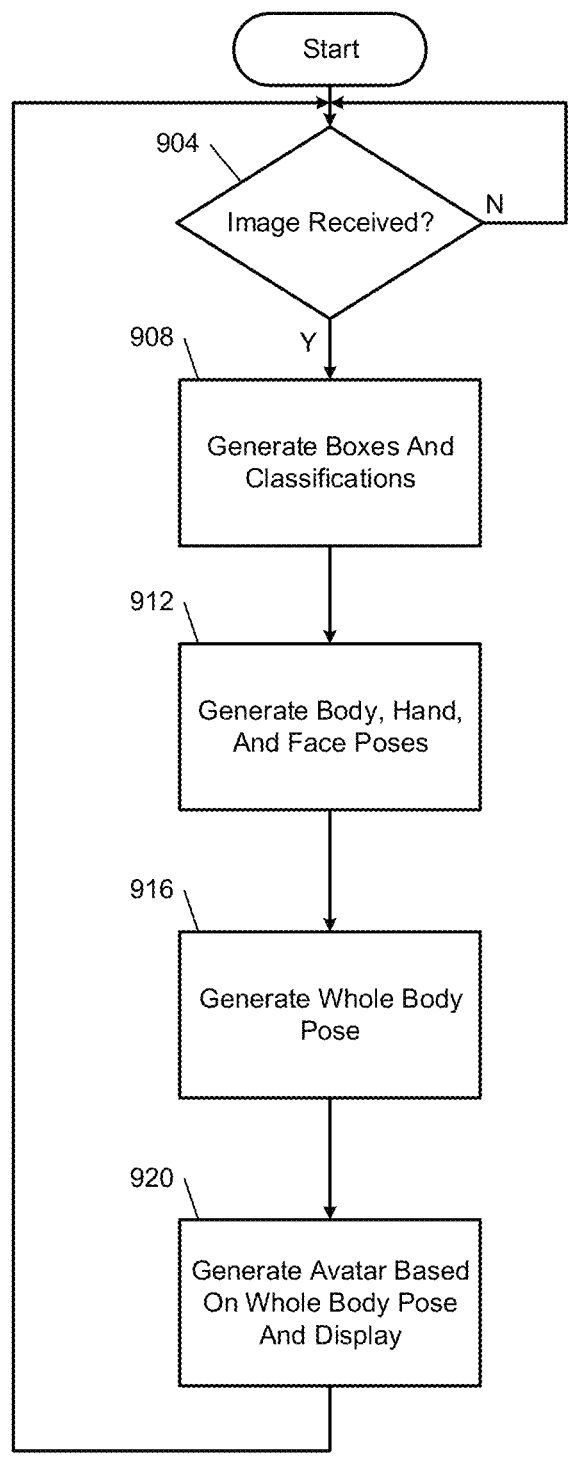
FIG. 9 includes a flowchart depicting an example method of generating whole body poses.

FIG. 9 is a flowchart depicting an example method of generating whole body poses of humans in images. Control begins with 904 where the pose estimation module 112 determines whether an image has been received. If 904 is true, control continues with 908. If 904 is false, control remains at 904.

At 908, the RPN module 308 determines the candidate boxes, and the image classification module 304 determines the classifications for the candidate boxes. The classification module 304 determines the classification using an image classification model, such as the ResNet-50 model or another suitable image classification model. The classifications are selected from a group consisting of body, hand, and face.

At 912, the body classification and regression modules 312 and 316 generate the body pose(s) for the image based on the candidate boxes using a body dataset, to train a body expert composed of the image classification+RPN+body classification+body regression on the body dataset. The head classification and regression modules 320 and 324 generate the head pose(s) for the image based on the candidate boxes. The face classification and regression modules 328 and 332 generate the face pose(s) for the image based on the candidate boxes.

At 916, the pose module 348 generates the whole body pose(s) based on the body, face, and hand pose(s). The pose module 348 generates the whole body pose(s) by connecting keypoints of the body, face, and hand poses. For example, the pose module 348 connects the head keypoint of the body pose and head keypoint of the face pose. The pose module 348 connects the hand pose(s) with the arm keypoints of the body pose.

One or more actions may be taken based on the whole body pose. For example, at 920, the animation module 116 may generate an image including an avatar with a body in the same pose as the whole body pose determined by the pose estimation module 112. The display control module 124 may display the avatar image on the display 108. While the example of displaying an avatar is provided, the whole body pose may additionally or alternatively be used in one or more other ways. Also, while the example of FIG. 9 is shown as ending, control may return to 904. Images may be received at a predetermined rate, such as 25 frames (images) per second or at another suitable rate.

Figure 10:
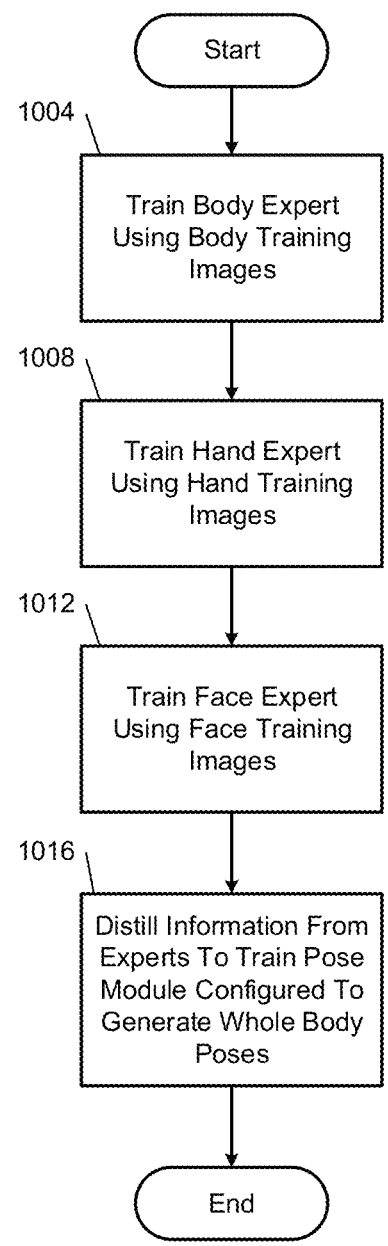
FIG. 10 is a flowchart depicting an example method of training a (whole body) pose estimation module.

FIG. 10 is a flowchart depicting an example method of training the pose estimation module 112. Control begins with 1004 where the training module 504 trains the body expert 604 using body images (or the body dataset 630). At 1008, the training module 504 trains the hand expert 608 using hand images (or the hand dataset 640). At 1012, the training module 504 trains the face expert 612 using face images (or the face dataset 652). While an example order is provided for 1004-1012, another suitable order may be used, or the experts may be trained concurrently (in parallel).

At 1016, the training module 504 distills information from the expert to train the pose module 112. Once training is complete (e.g., after a predetermined number of training images are completed or a predetermined number of epochs are completed, where each epoch includes training based on a predetermined number of training images), the pose estimation module 112 is then configured to determine whole body poses based on input images.

The foregoing description is merely illustrative in nature and is in no way intended to limit the disclosure, its application, or uses. The broad teachings of the disclosure can be implemented in a variety of forms. For example, while the disclosed embodiments describe systems and methods for generating whole body poses for humans, those skilled in the art will appreciate that it may also be used to generate whole body poses for another type of animal with the appropriate training. In addition, those skilled in the art will understand that depending on the application, additional expert modules may be added to the disclosed embodiments for generating whole body poses for humans. For example, expert foot classification and regression modules may be added to pose estimation module 112 that is directed at estimating the pose of human feet. In an alternate embodiment, different combinations of expert modules may be added or removed from pose estimate module 112 depending on the desired application (e.g., body+hand+face, body+hand+feet, or body+hand+feet+face). For example, animation module 116 may generate animated images for sports applications where the articulation of the pose of hands and feet are more relevant than the face. In yet a further embodiment, animation module 116 may generate animated images for animals that only have feet (or paws) for extremities (e.g., dogs, cats, etc.) and not hands as humans do.

Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for generating whole body poses, comprising:
   an image classification module configured to receive an input image and to generate classifications for boxes of pixels in the input image,
      wherein the classifications are selected from a group comprising a body classification, a face classification, and a hand classification;
   a regional proposal network (RPN) module configured to generate the boxes based on an input from the image classification module;
   a body regression module configured to generate a first pose of a body of an animal in the input image by regressing from a stored body anchor pose;
   a face regression module configured to generate a second pose of a face of the animal in the input image by regressing from a stored face anchor pose;
   an extremity regression module configured to generate a third pose of an extremity of the animal in the input image by regressing from a stored extremity anchor pose; and
   a pose module configured to generate a whole body pose of the animal in the input image based on the first pose, the second pose, and the third pose;
   wherein:
      the body regression module is configured to generate the first pose of the body of the animal based on first ones of the boxes having the body classification;
      the face regression module is configured to generate the second pose of the face of the animal based on second ones of the boxes having the body classification; and
      the extremity regression module is configured to generate the third pose of a hand of the animal based on third ones of the boxes having the hand classification.

2. The system of claim 1 wherein the pose module is configured to generate the whole body pose by:
   connecting a first keypoint of the first pose of the body with a second keypoint of the second pose of the face; and
   connecting a third keypoint of the first pose of the body with a fourth keypoint of the third pose of the extremity.

3. The system of claim 1 wherein the whole body pose is two dimensional.

4. The system of claim 1 wherein the whole body pose is three dimensional.

5. The system of claim 1 wherein the image classification module includes a ResNet-50 model.

6. The system of claim 5 wherein the input is an output of a third block of the ResNet-50 model.

7. The system of claim 1 wherein the RPN module is configured to generate the boxes using a region of interest (ROI) alignment algorithm.

8. The system of claim 1 wherein the body pose includes a pose of a torso of a human, a leg of the human, and a hand of the human.

9. The system of claim 1 further comprising an animation module configured to generate an image including an animated avatar based on the whole body pose of a human in the input image.

10. The system of claim 9 further comprising a display control module configured to display the image including the animated avatar on a display.

11. The system of claim 1 further comprising a camera configured to capture the input image.

12. The system of claim 1 further comprising:
   a body classification module configured to determine body scores based on comparisons of the body of a human in the input image with a plurality of stored body anchor poses,
   wherein the body regression module is configured to select the stored body anchor pose from the plurality of stored body anchor poses based on the body scores;

a face classification module configured to determine face scores based on comparisons of the face of the human in the input image with a plurality of stored face anchor poses, wherein the face regression module is configured to select the stored face anchor pose from the plurality of stored face anchor poses based on the face scores; and a hand extremity classification module configured to determine hand extremity scores based on comparisons of a hand of the human in the input image with a plurality of stored hand anchor poses, wherein the extremity regression module is a hand extremity regression module configured to, based on the hand scores, select the stored hand anchor pose from the plurality of stored extremity anchor poses that are hand anchor poses.

13. The system of claim 12 wherein:

the body regression module is configured to select the stored body anchor pose from the plurality of stored body anchor poses based on the body score of the stored body anchor pose being higher than the body scores of all of the other ones of the stored body anchor poses;

the face regression module is configured to select the stored face anchor pose from the plurality of face anchor poses based on the face score of the stored face anchor pose being higher than the face scores of all of the other ones of the stored face anchor poses; and the hand extremity regression module is configured to select the stored hand anchor pose from the plurality of hand anchor poses based on the hand score of the stored hand anchor pose being higher than the hand scores of all of the other ones of the stored hand anchor poses.

14. A training system comprising:

the system of claim 12; and a training module configured to:
train a body expert including the body classification and regression modules based on a first dataset including images including bodies of humans;
train a face expert including the face classification and regression modules based on a second dataset including images including faces of humans; and
train a hand extremity expert including the hand extremity classification and regression modules based on a third dataset including images including hands of humans.

15. The training system of claim 14 wherein the training module is further configured to train the pose module by distilling data from the body expert, the face expert, and the hand extremity expert.

16. A system for generating whole body poses, comprising:

an image classification module configured to receive an input image and to generate classifications for boxes of pixels in the input image, wherein the classifications are selected from a group comprising a body classification, a face classification, and a hand classification;

a regional proposal network (RPN) module configured to generate the boxes based on an input from the image classification module;

a body classification module configured to determine body scores based on comparisons of a body of an animal in an input image with stored body anchor poses;

a body regression module configured to:
select one of the stored body anchor poses based on the body scores; and
generate a first pose of the body in the input image by regressing the selected one of the stored body anchor poses;

a face classification module configured to determine face scores based on comparisons of a face of the animal in the input image with stored face anchor poses;

a face regression module configured to:
select one of the stored face anchor poses based on the face scores; and
generate a second pose of the face in the input image by regressing the selected one of the stored face anchor poses;

a hand classification module configured to determine hand scores based on comparisons of a hand of the animal in the input image with stored hand anchor poses;

a hand regression module configured to:
select one of the stored hand anchor poses based on the hand scores; and
generate a third pose of the hand in the input image by regressing the selected one of the stored hand anchor poses; and a pose module configured to generate a whole body pose of the animal in the input image based on the first pose of the body, the second pose of the face, and the third pose of the hand, wherein:
the body regression module is configured to generate the first pose of the body of the animal based on first ones of the boxes having the body classification;
the face regression module is configured to generate the second pose of the face of the animal based on second ones of the boxes having the body classification; and
the hand regression module is configured to generate the third pose of a hand of the animal based on third ones of the boxes having the hand classification.

17. A method of generating whole body poses, comprising:

by one or more processors, receiving an input image and generating classifications for boxes of pixels in the input image, wherein the classifications are selected from a group comprising a body classification, a face classification, and a hand classification;

by the one or more processors, generating the boxes based on an input regarding the classifications;

by one or more processors, generating a first pose of a body of an animal in an input image by regressing from a stored body anchor pose;

by the one or more processors, generating a second pose of a face of the animal in the input image by regressing from a stored face anchor pose;

by the one or more processors, generating a third pose of an extremity of the animal in the input image by regressing from a stored extremity anchor pose; and by the one or more processors, generating a whole body pose of the animal in the input image based on the first pose, the second pose, and the third pose, wherein:
the generating the first pose includes generating the first pose of the body of the animal based on first ones of the boxes having the body classification;

the generating the second pose includes generating the second pose of the face of the animal based on second ones of the boxes having the body classification; and the generating the third pose includes generating the third pose of a hand of the animal based on third ones of the boxes having the hand classification.

18. The method of claim 17 wherein:

the animal is a human;

the first pose is a pose of a body of the human;

the second pose is a pose of a face of the human; and the third pose is a pose of a hand of the human.

19. A system for generating whole body poses, comprising:

a means for receiving an input image and generating classifications for boxes of pixels in the input image, wherein the classifications are selected from a group comprising a body classification, a face classification, and a hand classification;

a means for generating the boxes based on an input from the means for generating classifications;

a means for generating a first pose of a body of an animal in an input image by regressing from a stored body anchor pose;

a means for generating a second pose of a face of the animal in the input image by regressing from a stored face anchor pose;

a means for generating a third pose of an extremity of the animal in the input image by regressing from a stored extremity anchor pose; and a means for generating a whole body pose of the animal in the input image based on the first pose, the second pose, and the third pose, wherein:

the means for generating the first pose is for generating the first pose of the body of the animal based on first ones of the boxes having the body classification;

the means for generating the second pose is for generating the second pose of the face of the animal based on second ones of the boxes having the body classification; and the means for generating the third pose is for generating the third pose of a hand of the animal based on third ones of the boxes having the hand classification.

20. A system for generating whole body poses, comprising:

an image classification module configured to receive an input image and to generate classifications for boxes of pixels in the input image, wherein the image classification module includes a ResNet-50 model;

a regional proposal network (RPN) module configured to generate the boxes based on an input from the image classification module;

a body regression module configured to generate a first pose of a body of an animal in the input image by regressing from a stored body anchor pose;

a face regression module configured to generate a second pose of a face of the animal in the input image by regressing from a stored face anchor pose;

an extremity regression module configured to generate a third pose of an extremity of the animal in the input image by regressing from a stored extremity anchor pose; and a pose module configured to generate a whole body pose of the animal in the input image based on the first pose, the second pose, and the third pose.

21. A training system, comprising:

a system for generating whole body poses, the system comprising:

a body regression module configured to generate a first pose of a body of an animal in an input image by regressing from a stored body anchor pose;

a face regression module configured to generate a second pose of a face of the animal in the input image by regressing from a stored face anchor pose;

an extremity regression module configured to generate a third pose of an extremity of the animal in the input image by regressing from a stored extremity anchor pose;

a pose module configured to generate a whole body pose of the animal in the input image based on the first pose, the second pose, and the third pose;

a body classification module configured to determine body scores based on comparisons of the body of the animal in the input image with a plurality of stored body anchor poses, wherein the body regression module is configured to select the stored body anchor pose from the plurality of stored body anchor poses based on the body scores;

a face classification module configured to determine face scores based on comparisons of the face of the animal in the input image with a plurality of stored face anchor poses, wherein the face regression module is configured to select the stored face anchor pose from the plurality of stored face anchor poses based on the face scores; and a hand extremity classification module configured to determine hand extremity scores based on comparisons of a hand of the animal in the input image with a plurality of stored hand anchor poses, wherein the extremity regression module is a hand extremity regression module configured to, based on the hand scores, select the stored hand anchor pose from the plurality of stored extremity anchor poses that are hand anchor poses; and a training module configured to:

train a body expert including the body classification and regression modules based on a first dataset including images including bodies of animals;

train a face expert including the face classification and regression modules based on a second dataset including images including faces of animals; and train a hand extremity expert including the hand extremity classification and regression modules based on a third dataset including images including hands of animals.

* * * * *